(12) United States Patent
Wang et al.

(10) Patent No.: US 10,066,128 B2
(45) Date of Patent: Sep. 4, 2018

(54) METHOD FOR PREPARING AN ALUMINUM OXIDE POLISHING SOLUTION

(71) Applicants: Shanghai Xinanna Electronic Technology Co., LTD, Shanghai (CN); Shanghai Institute of Microsystem and Information Technology, Chinese Academy of Sciences, Shanghai (CN)

(72) Inventors: Weilei Wang, Shanghai (CN); Weili Liu, Shanghai (CN); Zhitang Song, Shanghai (CN)

(73) Assignee: SHANGHAI XINANNA ELECTRONIC TECHNOLOGY CO., LTD, Shanghai (CN)

( * ) Notice: Subject to any disclaimer, the term of this patent is extended or adjusted under 35 U.S.C. 154(b) by 0 days.

(21) Appl. No.: 15/219,540

(22) Filed: Jul. 26, 2016

(65) Prior Publication Data

US 2017/0362463 A1 Dec. 21, 2017

(30) Foreign Application Priority Data

Jun. 20, 2016 (CN) .......................... 2016 1 0445394

(51) Int. Cl.
*C09G 1/02* (2006.01)
*C09K 3/14* (2006.01)

(52) U.S. Cl.
CPC .............. *C09G 1/02* (2013.01); *C09K 3/1436* (2013.01)

(58) Field of Classification Search
None
See application file for complete search history.

(56) References Cited

U.S. PATENT DOCUMENTS 5,250,085 A * 10/1993 Mevissen ............. C09K 3/1409
51/293
5,384,194 A 1/1995 Deusser et al.
(Continued)

FOREIGN PATENT DOCUMENTS

CN 1440449 A 9/2003
CN 1538936 A 10/2004
(Continued)

OTHER PUBLICATIONS

International Search Report and Written Opinion issued in corresponding International Application No. PCT/CN2016/097897, dated Mar. 29, 2017, 15 pages.
(Continued)

*Primary Examiner* — Allan Olsen
(74) *Attorney, Agent, or Firm* — Arch & Lake LLP

(57) ABSTRACT

The present disclosure provides a method for preparing an aluminum oxide polishing solution. The methods include: 1) mixing a silane coupling agent, ethyl alcohol, and water to form a hydrolysate; 2) under a condition of heating and stirring at a temperature between 95° C. and 110° C., adding the hydrolysate into aluminum oxide powder; keeping stirring while heating till liquid is completely volatilized, thereby obtaining a modified aluminum oxide; 3) grinding the modified aluminum oxide into powder and dispersing the powder into water; adjusting solution pH to 9.5-10.5, thereby obtaining the aluminum oxide polishing solution. It may achieve a polishing efficiency of pH=13.00 by using the aluminum oxide polishing solution of the present disclosure; meanwhile, less scratches will occur to a polishing disc.

7 Claims, 1 Drawing Sheet

(56) References Cited

U.S. PATENT DOCUMENTS

| | | | | |
|---|---|---|---|---|
| 6,299,659 B1* | 10/2001 | Kido | .................. | C09G 1/02 |
| | | | | 106/3 |
| 6,946,009 B2* | 9/2005 | Ito | .................. | C03C 19/00 |
| | | | | 423/263 |
| 9,486,892 B2* | 11/2016 | Onishi | .................. | C09G 1/02 |
| 9,662,763 B2* | 5/2017 | Asano | .................. | B24B 37/044 |
| 2002/0017064 A1* | 2/2002 | Shimazu | .................. | C09G 1/02 |
| | | | | 51/309 |
| 2002/0099121 A1* | 7/2002 | Oshima | .................. | C08K 3/22 |
| | | | | 524/431 |
| 2004/0022950 A1* | 2/2004 | Jung | .................. | C09D 5/002 |
| | | | | 427/385.5 |
| 2004/0054044 A1* | 3/2004 | Bittner | .................. | C09D 5/08 |
| | | | | 524/261 |
| 2004/0154229 A1* | 8/2004 | Ito | .................. | C03C 19/00 |
| | | | | 51/307 |
| 2007/0232197 A1* | 10/2007 | Amanokura | .................. | C09G 1/02 |
| | | | | 451/37 |
| 2009/0042166 A1* | 2/2009 | Craig | .................. | A61C 3/02 |
| | | | | 433/166 |
| 2010/0181525 A1* | 7/2010 | Belmont | .................. | B82Y 30/00 |
| | | | | 252/79.1 |
| 2013/0324015 A1* | 12/2013 | Asano | .................. | B24B 37/044 |
| | | | | 451/59 |
| 2013/0327977 A1 | 12/2013 | Singh et al. | | |
| 2015/0344738 A1* | 12/2015 | Onishi | .................. | C09G 1/02 |
| | | | | 438/692 |
| 2016/0288289 A1* | 10/2016 | Suzuki | .................. | H01L 21/31053 |

FOREIGN PATENT DOCUMENTS

| | | |
|---|---|---|
| CN | 1560161 A | 1/2005 |
| CN | 1809620 A | 7/2006 |
| CN | 102352186 A | 2/2012 |
| CN | 102660195 A | 9/2012 |
| CN | 103589644 A | 2/2014 |
| CN | 104556060 A | 4/2015 |
| CN | 104559798 A | 4/2015 |
| CN | 104559799 A | 4/2015 |
| JP | 2008155311 A | 7/2008 |
| JP | 2008260815 A | 10/2008 |

OTHER PUBLICATIONS

First Search (including English translation) issued in corresponding Chinese Patent Application No. 2016104453940, dated Jun. 13, 2017, 2 pages.

First Office Action (including English translation) issued in corresponding Chinese Patent Application No. 201610445394.0, dated Jun. 23, 2017, 11 pages.

* cited by examiner

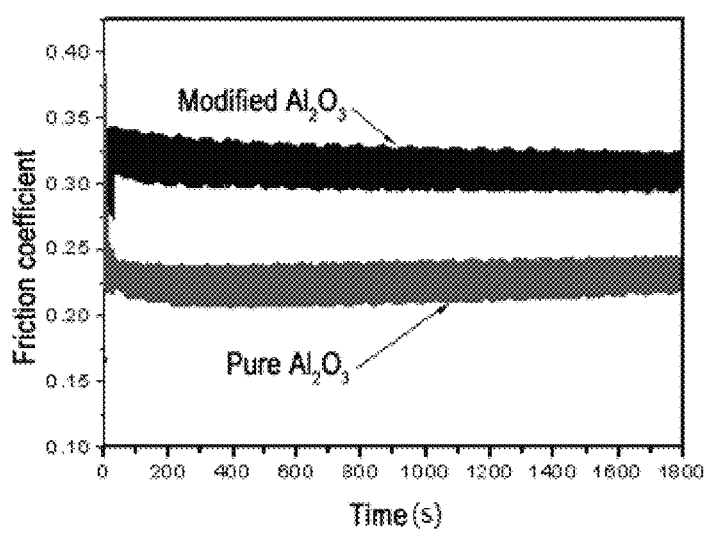

METHOD FOR PREPARING AN ALUMINUM OXIDE POLISHING SOLUTION

CROSS REFERENCE TO RELATED APPLICATION

The present application claims the benefit of Chinese Patent Application No. 201610445394.0, filed on Jun. 20, 2016, the entire disclosure of which is incorporated herein by reference.

FIELD OF THE DISCLOSURE

The present disclosure relates to a field of a polishing solution, and specifically relates to a method of preparing an aluminum oxide polishing solution.

BACKGROUND OF THE DISCLOSURE

Expeditious development of integrated circuit technologies is increasingly demanding on a surface quality of a substrate material in use. With the diminishing of device dimension and reduction of focal depth of optical lithographic devices, it is required that an acceptable resolution flatness of a wafer surface should reach a nanometer order. In order to solve this problem, the CMP (Chemical Mechanical Polishing) technology that can achieve global planarization has become one of key technologies for semiconductor manufacturing. α-aluminum oxide ($\alpha$-$Al_2O_3$) is substantively the same substance or material as sapphire, because their atomic arrangement patterns in the material structure are completely identical, except for the difference in polycrystal and monocrystal. Therefore, in terms of hardness, the nanometer-powder of the $\alpha$-$Al_2O_3$ is equivalent to that of the sapphire crystal; therefore, it may be used for polishing the sapphire crystal. The $\alpha$-$Al_2O_3$ powder may be manufactured into different polishing solutions with an average particle size ranging from 100 nm to 1000 nm above, for being used in different procedures of roughly polishing and finely polishing the sapphire crystal. However, till now, the $\alpha$-$Al_2O_3$ polishing solution has not been widely applied to polishing sapphire. The $\alpha$-$Al_2O_3$ particles need to be sintered at a high-temperature of 1000° C. above, causing a phase shift from a transitional aluminum oxide to $\alpha$-$Al_2O_3$. During this procedure, the $Al_2O_3$ particles are easily agglomerated; besides, these agglomerates are hard and dense; therefore, they can hardly be dispersed in the polishing solution; in addition, agglomerated aluminum oxide particles very easily cause scratches and damages during the polishing procedures. Furthermore, it is also very easy for the aluminum oxide to deposit in the polishing solution to form hard chunks at the bottom of a container; therefore, it is needed to constantly stir during the use process. These drawbacks seriously hamper the aluminum oxide polishing solution to be applied for finely polishing sapphire. Moreover, in order to reduce erosion from the polishing solution to a machine stand, alkaline polishing solutions are mostly used in the market; it is also so for the aluminum oxide. The alkalinity of alkaline aluminum oxide used in the industry is generally very high, reaching 12.5 above, which also causes a high damage to equipment.

SUMMARY OF THE DISCLOSURE

An objective of the present disclosure is to provide a method of preparing an aluminum oxide polishing solution in order to overcome the drawbacks and problems in the prior art, such that a superb polishing effect can be achieved with a low alkalinity.

In order to achieve the above and other objectives, the present disclosure is implemented through a technical solution below:

A method for preparing an aluminum oxide polishing solution, comprising:

1) mixing a silane coupling agent, ethyl alcohol, and water to form a hydrolysate;

2) under a condition of heating and stirring at a temperature between 95° C. and 110° C., adding the hydrolysate into aluminum oxide powder, keeping stirring while heating, till liquid is completely volatilized, thereby obtaining a modified aluminum oxide;

3) grinding the modified aluminum oxide into powder and dispersing the powder into water, and adjusting the solution pH to 9.5-10.5, thereby obtaining the aluminum oxide polishing solution.

Preferably, in step 1), with a total weight of the hydrolysate as a reference, the silane coupling agent is in an amount of 15-25 wt %, the ethyl alcohol is in a an amount of 67-77 wt %, and the water is in a an amount of 3-13 wt %.

Preferably, a model of the silane coupling agent in step 1) is KH792 also known as N-(2-aminoethyl)-3-aminopropyl-trimethoxysilane).

Preferably, in step 1), the temperature for mixing is 75-85° C. The mixing in step 1) may adopt a common method in the prior art for mixing such that various constituents are evenly mixed. Preferably, in step 1), a stirring mixing manner is employed for stirring.

Preferably, in step 1), the time for mixing is 20 min above.

Preferably, in step 2), particle sizes of the aluminum oxide powder is ranging from 0.04 to 2 μm.

Preferably, in step 2), the weight of the aluminum oxide powder is 3-7% of the hydrolysate weight.

Preferably, in step 2), the aluminum oxide includes α-aluminum oxide.

Preferably, in step 3), the particle size of the modified aluminum oxide powder ranges from 200 to 400 nm.

Preferably, in step 3), the solution pH is adjusted using sodium hydroxide or potassium hydroxide water solution.

Preferably, in step 3), the modified aluminum oxide is washed before grinding.

Preferably, the preparing method further comprises performing stirring and aging processing to the aluminum oxide polishing solution in step 3), the aging processing lasting 1-24 h.

Preferably, in step 3), with a total weight of the aluminum oxide polishing solution as a reference, the content of the modified aluminum oxide power by weight percentage is 3-7 wt %.

In the present disclosure, there is further disclosed an aluminum oxide polishing solution, prepared according to the method above.

In the present disclosure, there is further disclosed usage of the aluminum oxide polishing solution in the field of sapphire wafer polishing.

Embodiments of the present disclosure provides a method of preparing a highly-efficient low-alkalinity aluminum oxide polishing solution, which performs a modification treatment to the aluminum oxide, such that a surface nature of the modified aluminum oxide is changed and its friction coefficient is raised. In this way, the friction force when the modified aluminum oxide is applied to a polishing solution will increase, which accelerates the friction speed. When the prepared aluminum oxide polishing solution performs polishing at a pH of 9.5-10.5, a higher friction coefficient and polishing efficiency can be achieved. It has been verified that with the aluminum oxide polishing solution in the technical solution of the present disclosure, it may achieve a polishing efficiency at a pH of 9.5-10.5, which would be achieved by a conventionally unmodified aluminum oxide polishing solution at a pH=13.00. Meanwhile, less scratches occur to the polishing disc, thereby greatly reducing damages to the machine stand.

BRIEF DESCRIPTION OF THE ACCOMPANYING DRAWINGS

FIG. 1 illustrates a friction coefficient diagram of a friction coefficient of the aluminum oxide particles in Example 1 and a friction coefficient of the aluminum oxide particles in Example 3 which is derived from a modification solution in the present disclosure.

DETAILED DESCRIPTION OF THE PREFERRED EMBODIMENTS

Hereinafter, the examples of the present disclosure will be illustrated in detail. The examples are implemented under the precondition of the technical solution of the present disclosure and provide detailed embodiments and specific operation procedures; however, the protection scope of the present disclosure is not limited to the examples below.

Example 1: Prepare an Aluminum Oxide Polishing Solution as a Comparative Example Take aluminum oxide powder with a particle size of 40 nm, disperse it into a water solution by stirring; obtain an aluminum oxide concentration of 5 wt %; regulate a pH=10.00 aluminum oxide dispersion solution using 2 mol/L KOH solution.

Experiments on the polishing rate of the aluminum oxide polishing solution and the surface roughness of the polished sapphire are shown in Table 1 below.

Example 2 Prepare an Aluminum Oxide Polishing Solution as a Comparative Example Take aluminum oxide powder with a particle size of 40 nm, disperse it into a water solution by stirring; obtain an aluminum oxide concentration of 5 wt %; regulate a pH=13.00 aluminum oxide dispersion solution using 2 mol/L KOH solution.

Experiments on the polishing rate of the aluminum oxide polishing solution and the surface roughness of the polished sapphire are shown in Table 1 below.

Example 3 Prepare an Aluminum Oxide Polishing Solution Using the Method in the Present Disclosure Make up a solution using 4 g silane coupling agent KH792 (also known as N-(2-aminoethyl)-3-aminopropyltrimethoxysilane), 14.4 g ethyl alcohol, 1.6 g water; at a constant temperature of 80° C., stir and hydrolyze for half an hour to form a hydrolysate; under the condition of heating and stirring, adding the hydrolysate into 25 g aluminum oxide power with a particle size of 0.04-2 μm; stirring while heating at 100° C., till the liquid is almost completely volatized; completely volatize the liquid with the remaining heat, thereby obtaining a modified aluminum oxide; wash and centrifuge the modified aluminum oxide, and grind it into particle size of 200-400 nm; disperse the ground modified aluminum oxide powder into water, and regulate the pH to 10.00 using 2 mol/L potassium hydroxide; continue stirring for 1 hour to obtain a 5 wt % aluminum oxide polishing solution.

Experiments on the polishing rate of the aluminum oxide polishing solution and the surface roughness of the polished sapphire are shown in Table 1 below.

FIG. 1 illustrates a friction coefficient diagram of a friction coefficient of the aluminum oxide particles in Example 1 and a friction coefficient of the aluminum oxide particles in Example 3 which is derived from a modification solution in the present disclosure. As shown in the FIGURE that with the modification technical solution in the present application, the surface nature of the modified aluminum oxide achieved by modifying aluminum oxide changed, and the friction coefficient increased.

Example 4 Prepare an Aluminum Oxide Polishing Solution Using the Method in the Present Disclosure Make up a solution using 4 g silane coupling agent KH792 (also known as N-(2-aminoethyl)-3-aminopropyltrimethoxysilane), 14.4 g ethyl alcohol, and 1.6 g water; at a constant temperature of 80° C., stir and hydrolyze for half an hour to form a hydrolysate; under the condition of heating and stirring, adding the hydrolysate into 25 g aluminum oxide power with a particle size of 0.04-2 μm; stirring while heating at 100° C., till the liquid is almost completely volatized; completely volatize the liquid with the remaining heat, thereby obtaining a modified aluminum oxide; wash and centrifuge the modified aluminum oxide, and grind it into particle size of 200-400 nm; disperse the ground modified aluminum oxide powder into water, and regulate the pH to 13.00 using 2 mol/L potassium hydroxide; continue stirring for 1 hour to obtain a 5 wt % aluminum oxide polishing solution.

Experiments on the polishing rate of the aluminum oxide polishing solution and the surface roughness of the polished sapphire are shown in Table 1 below.

Example 5

Make up a solution using 17 g silane coupling agent KH792 (also known as N-(2-aminoethyl)-3-aminopropyltrimethoxysilane), 70 g ethyl alcohol, 13 g water; at a constant temperature of 80° C., stir and hydrolyze to form a hydrolysate; under the condition of heating and stirring, adding the hydrolysate into 25 g aluminum oxide power with a particle size of 0.04-2 μm; stirring while heating at 100° C., till the liquid is almost completely volatized; completely volatize the liquid with the remaining heat, thereby obtaining a modified aluminum oxide; wash and centrifuge the modified aluminum oxide, and grind it into particle size of 200-400 nm; disperse the ground modified aluminum oxide powder into water, and regulate the pH to 10.00 using 2 mol/L sodium hydroxide; continue stirring for 1 hour to obtain a 5 wt % aluminum oxide polishing solution.

Example 6

Make up a solution using 25 g silane coupling agent KH792 also known as N-(2-aminoethyl)-3-aminopropyltrimethoxysilane), 67 g ethyl alcohol, 8 g water; at a constant temperature of 75° C., stir and hydrolyze to form a hydrolysate; under the condition of heating and stirring, adding the hydrolysate into 25 g aluminum oxide power with a particle size of 0.04-2 μm; stirring while heating at 95° C., till the liquid is almost completely volatized; completely volatize the liquid with the remaining heat, thereby obtaining a modified aluminum oxide; wash and centrifuge the modified aluminum oxide, and grind it into particle size of 200-400 nm; disperse the ground modified aluminum oxide powder into water, and regulate the pH to 9.50 using 2 mol/L potassium hydroxide; continue stirring for 1 hour to obtain a 3 wt % aluminum oxide polishing solution.

Example 7

Make up a solution using 15 g silane coupling agent KH792 also known as N-(2-aminoethyl)-3-aminopropyltrimethoxysilane), 77 g ethyl alcohol, 8 g water; at a constant temperature of 85° C., stir and hydrolyze to form a hydrolysate; under the condition of heating and stirring, adding the hydrolysate into 25 g aluminum oxide power with a particle size of 0.04-2 μm; stirring while heating at 105° C., till the liquid is almost completely volatized; completely volatize the liquid with the remaining heat, thereby obtaining a modified aluminum oxide; wash and centrifuge the modified aluminum oxide, and grind it into particle size of 200-400 nm; disperse the ground modified aluminum oxide powder into water, and regulate the pH to 10.50 using 2 mol/L potassium hydroxide; continue stirring for 1 hour to obtain a 7 wt % aluminum oxide polishing solution.

Example 8

Make up a solution using 20 g silane coupling agent KH792 also known as N-(2-aminoethyl)-3-aminopropyltrimethoxysilane), 77 g ethyl alcohol, 3 g water; at a constant temperature of 75° C., stir and hydrolyze for half an hour to form a hydrolysate; under the condition of heating and stirring, adding the hydrolysate into 25 g aluminum oxide power with a particle size of 0.04-2 μm; stirring while heating at 102° C., till the liquid is almost completely volatized; completely volatize the liquid with the remaining heat, thereby obtaining a modified aluminum oxide; wash and centrifuge the modified aluminum oxide, and grind it into particle size of 200-400 nm; disperse the ground modified aluminum oxide powder into water, and regulate the pH to 10.10 using 2 mol/L potassium hydroxide; continue stirring to obtain a 6 wt % aluminum oxide polishing solution.

Hereinafter, the aluminum oxide polishing solution polishing experiment and surface roughness experiment are also provided below:

Use 500 g aluminum oxide polishing solution prepared according to Examples 1-5 for polishing a C-phase sapphire wafer.

Polishing experiment: adhering a two inches C-phase sapphire sheet to a polishing head through a back membrane absorbing method. The polishing parameters are provided below: the polishing mat uses SUBA 600; the polishing pressure was 6 psi; the rotation speed of the polishing mat was 100 rpm; the rotation speed of the polished wafer was 90 rpm; the flow rate of the polishing solution was 125 ml/min; the polishing time was 30 min. After each time the polishing ends, the polishing mat was repaired for 5 minutes using a 4-inch diamond repair disc. The polished sapphire sheet was ultrasonically washed for 10 minutes in a washing liquid and then blown dry with nitrogen gas. The surface quality condition of the polished sapphire sheet was observed with an atomic force microscope. The quality difference of the sapphire sheet before and after polishing was measured to represent the polishing speed. The results are listed in Table 1.

TABLE 1

Comparison Results of Polishing Experiments

| pH | Particle Type | Polishing rate (0.0001 g/ 30 min) | Surface roughness before polishing (nm) | Surface roughness(nm) after polishing |
|---|---|---|---|---|
| 10.00 | Pure aluminum oxide | 46 | 0.968 | 0.610 |
| | Modified aluminum oxide in Example 3 | 127 | 0.610 | 0.329 |
| | Modified aluminum oxide in Example 5 | 139 | 0.981 | 0.315 |
| 13.00 | Pure aluminum oxide | 93 | 0.916 | 0.552 |
| | Modified aluminum oxide in Example 4 | 122 | 0.552 | 0.311 |

As shown in the Examples and effect data that when other conditions were all identical, the polishing solution formed by the modified aluminum oxide in the present disclosure at a pH=10 may achieve the polishing effect and polishing rate that were achieved by a normal aluminum oxide polishing solution at a pH=13; therefore, the present disclosure greatly enhances the productivity efficiency, and avoids damaging a machine stand by a high-pH value polishing solution; therefore, the present disclosure facilitates mass industrial production.

When the embodiments provide a numerical value range, it should be understood that unless otherwise stated, two end points of each value range and any value between the two ends may be selected for use. Unless otherwise defined, all technological and scientific terms used in the present disclosure are identical to the meanings generally understood by those skilled in the art. Besides the special method, equipment, and material used in the embodiments, according to knowledge in the art known well to the skilled person and to the disclosure of the present invention, any method, equipment and material in the prior art similar or equivalent to the method, equipment, and material in the embodiments of the present disclosure may also be used to implement the present disclosure.

What is claimed is:

1. A method for preparing an aluminum oxide polishing solution, comprising:
   1) mixing a silane coupling agent, ethyl alcohol, and water to form a hydrolysate;
   2) under a condition of heating and stirring at a temperature between 95° C. and 110° C., adding the hydrolysate into an aluminum oxide powder, keeping stirring while heating, until liquid is completely volatilized, thereby obtaining a modified aluminum oxide; and
   3) grinding the modified aluminum oxide into powder and dispersing the powder into water, and adjusting solution pH to 9.5~10.5, thereby obtaining the aluminum oxide polishing solution.

2. The method according to claim 1, wherein in step 1), with a total weight of the hydrolysate as a reference, the silane coupling agent is in an amount of 15~25 wt %, the ethyl alcohol is in an amount of 67~77 wt %, and the water is in an amount of 3~13 wt %.

3. The method according to claim 1, wherein in step 1), the temperature for mixing is 75~85° C.

4. The method according to claim 1, wherein in step 2), a particle size of the aluminum oxide powder ranges from 0.04 to 2 μm.

5. The method according to claim 1, wherein in step 2), the weight of the aluminum oxide powder is 3~7% of the hydrolysate weight.

6. The method according to claim 1, wherein in step 2), the aluminum oxide include α-aluminum oxide.

7. The method according to claim 1, wherein in step 3), a particle size of the modified aluminum oxide powder ranges from 200 to 400 nm.

* * * * *